US011926516B2

(12) United States Patent
Tran et al.

(10) Patent No.: US 11,926,516 B2
(45) Date of Patent: Mar. 12, 2024

(54) BEVERAGE DISPENSING SYSTEMS WITH LIMITED TIME OFFERING CIRCUITS

(71) Applicant: The Coca-Cola Company, Atlanta, GA (US)

(72) Inventors: Son Van Tran, Atlanta, GA (US); Douglas J. McDougall, Atlanta, GA (US); Patrick May, Atlanta, GA (US)

(73) Assignee: THE COCA-COLA COMPANY, Atlanta, GA (US)

( * ) Notice: Subject to any disclaimer, the term of this patent is extended or adjusted under 35 U.S.C. 154(b) by 118 days.

(21) Appl. No.: 17/426,167

(22) PCT Filed: Feb. 4, 2020

(86) PCT No.: PCT/US2020/016519
§ 371 (c)(1),
(2) Date: Jul. 28, 2021

(87) PCT Pub. No.: WO2020/163281
PCT Pub. Date: Aug. 13, 2020

(65) Prior Publication Data

US 2022/0112066 A1 Apr. 14, 2022

Related U.S. Application Data

(60) Provisional application No. 62/883,956, filed on Aug. 7, 2019, provisional application No. 62/801,838, filed on Feb. 6, 2019.

(51) Int. Cl.
*B67D 1/00* (2006.01)
*B67D 1/04* (2006.01)
(Continued)

(52) U.S. Cl.
CPC ........... *B67D 1/0037* (2013.01); *B67D 1/006* (2013.01); *B67D 1/0068* (2013.01);
(Continued)

(58) Field of Classification Search
CPC .... B67D 1/0037; B67D 1/006; B67D 1/0068; B67D 1/0085; B67D 1/0406; B67D 1/07;
(Continued)

(56) References Cited

U.S. PATENT DOCUMENTS

| | | | | |
|---|---|---|---|---|
| 2,710,119 A * | 6/1955 | Steele | B67D 1/10 417/511 | |
| 3,082,359 A * | 3/1963 | Mangiafico | F16K 31/0658 335/260 | |

(Continued)

FOREIGN PATENT DOCUMENTS

| | | | |
|---|---|---|---|
| CA | 2 290 129 | A1 | 5/2000 |
| EP | 0272159 | A2 | 6/1988 |

(Continued)

OTHER PUBLICATIONS

International Search Report and Written Opinion, PCT/US2020/016519, dated Jun. 5, 2020 (9 pp.).
Search Report for EP20752769.8 dated Sep. 30, 2022 (6 pp.).

*Primary Examiner* — Donnell A Long
(74) *Attorney, Agent, or Firm* — Eversheds Sutherland (US) LLP

(57) ABSTRACT

The present application provides a beverage dispenser capable of dispensing one or more limited time offering beverages. The beverage dispenser may include a dispensing valve, a limited time offering ingredient source, and a limited time offering circuit extending between the dispensing valve and the limited time offering ingredient source. The limited time offering circuit may include a stainless steel line extending between the dispensing valve and the limited time offering ingredient source.

12 Claims, 4 Drawing Sheets

(51) Int. Cl.
*B67D 1/07* (2006.01)
*B67D 1/08* (2006.01)
*B67D 1/12* (2006.01)

(52) U.S. Cl.
CPC ......... *B67D 1/0085* (2013.01); *B67D 1/0406* (2013.01); *B67D 1/07* (2013.01); *B67D 1/0864* (2013.01); *B67D 1/1211* (2013.01)

(58) Field of Classification Search
CPC .. B67D 1/0864; B67D 1/1211; B67D 1/1245; B67D 1/10
See application file for complete search history.

(56) References Cited

U.S. PATENT DOCUMENTS

| | | | | | |
|---|---|---|---|---|---|
| 3,540,476 | A * | 11/1970 | Fuerst | B67D 1/0085 | 251/149.9 |
| 3,584,762 | A * | 6/1971 | Vantroba | B67D 1/0048 | 137/170.4 |
| 3,898,861 | A * | 8/1975 | McMillin | B67D 1/0021 | 137/238 |
| 4,225,059 | A * | 9/1980 | Kappos | B67D 1/04 | 222/608 |
| 4,310,025 | A * | 1/1982 | Tracy | B01F 23/23413 | 137/625.48 |
| 5,072,859 | A * | 12/1991 | Wiley | B67D 1/0857 | 222/145.2 |
| 5,097,991 | A * | 3/1992 | Lance | G01F 11/32 | 222/453 |
| 5,592,867 | A * | 1/1997 | Walsh | B67D 1/0057 | 261/DIG. 7 |
| 6,207,046 | B1 * | 3/2001 | Yamashita | B67D 3/0009 | 422/38 |
| 7,293,675 | B1 | 11/2007 | Luhn | | |
| 2004/0074393 | A1 | 4/2004 | Minard et al. | | |
| 2009/0236361 | A1 | 9/2009 | Doelman et al. | | |
| 2014/0209634 | A1 | 7/2014 | Metropulos et al. | | |
| 2015/0315006 | A1 * | 11/2015 | Ziesel | B67D 1/0051 | 222/1 |
| 2017/0305734 | A1 | 10/2017 | Nachawati et al. | | |
| 2018/0162710 | A1 * | 6/2018 | Moore | B67D 1/0043 | |
| 2019/0002264 | A1 | 1/2019 | Madden et al. | | |

FOREIGN PATENT DOCUMENTS

| | | | | |
|---|---|---|---|---|
| WO | WO-0239824 | A1 * | 5/2002 | B67D 1/02 |
| WO | 2009045099 | A2 | 4/2009 | |
| WO | 2017087874 | A1 | 5/2017 | |

* cited by examiner

BEVERAGE DISPENSING SYSTEMS WITH LIMITED TIME OFFERING CIRCUITS

TECHNICAL FIELD

The present application and the resultant patent relate generally to beverage dispensers and more particularly relate to beverage dispensers having one or more limited time offering circuits to accommodate new beverages and/or flavors without extensive downtime.

BACKGROUND OF THE INVENTION

Generally described, current post-mix beverage dispensers usually mix streams of syrup, concentrate, sweetener, bonus flavors, other types of flavoring, and/or other types of ingredients with water and/or other types of diluent. The ingredients may be stored in a bag-in-box containers and the like at a distance from the beverage dispenser. The ingredients may be pumped to the dispenser and mixed in or downstream of the nozzle.

Any surface of the beverage dispenser that touches the syrups, concentrates, and other ingredients must be thoroughly cleaned when changing from one beverage brand or flavor to another. Specifically, the lines, the pumps, the valves, and other components must be cleaned. Lingering flavor absorption in the materials of the components also may be a concern. A service call or other types of downtime or expense thus may be required to change a beverage brand or flavor.

As a result, the operator of the beverage dispenser may be reluctant to provide limited time offerings of different beverage brands or flavors. These limited time offerings may be regional, seasonal, promotional, and the like. For example, certain types of "pumpkin spice" beverages may be popular in the fall. Many other types of limited time offering opportunities thus may be missed. Moreover, the operator also may be reluctant to try new beverages or flavors without an established or predictable volume expectation.

There is thus a desire for an improved beverage dispenser with one or more limited time offering circuits. Such an improved beverage dispenser may provide new and different beverage brands and flavors without a service call or extensive downtime.

SUMMARY OF THE INVENTION

The present application and the resultant patent thus provide a beverage dispenser capable of dispensing one or more limited time offering beverages. The beverage dispenser may include a dispensing valve, a limited time offering ingredient source, and a limited time offering circuit extending between the dispensing valve and the limited time offering ingredient source. The limited time offering circuit may include a stainless steel line extending between the dispensing valve and the limited time offering ingredient source.

The present application and the resultant patent further provide a method of changing over a bag-in-box of a beverage dispenser. The method may include the steps of disconnecting a stainless steel line from an existing bag-in-box, placing the stainless steel line a sanitation solution, flushing the stainless steel line for a predetermined duration, sanitizing a dispensing nozzle, connecting the stainless steel line to a new bag-in-box, and priming the stainless steel line. Other type of method steps may be used herein.

These and other features and improvements of the present application and the resultant patent will become apparent to those of ordinary skill in the art upon review of the following detailed description when taken in conjunction with the several drawings and the appended claims.

DETAILED DESCRIPTION

Figure 1:
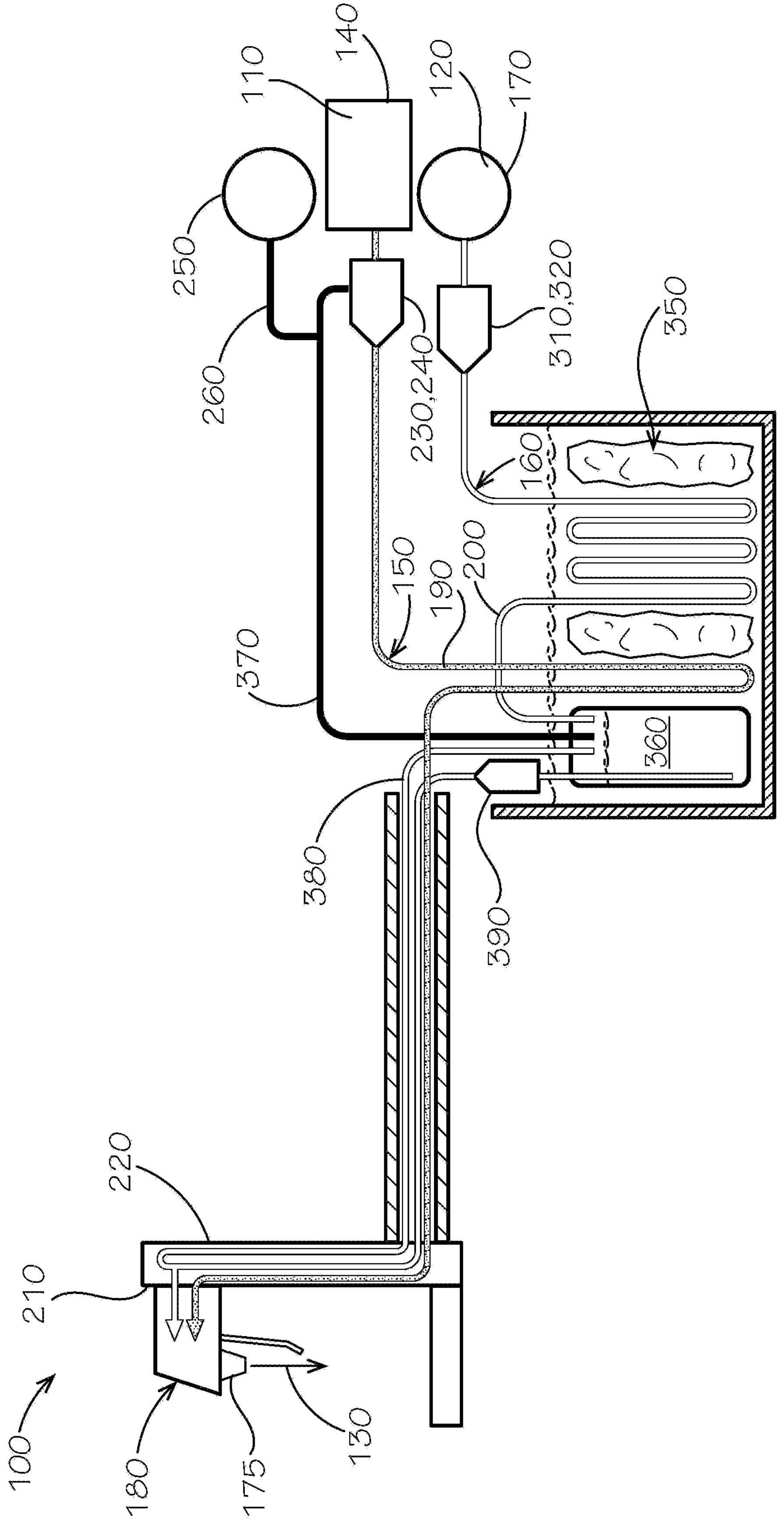
FIG. 1 is a schematic diagram of a beverage dispenser as may be described herein.
Figure 2:
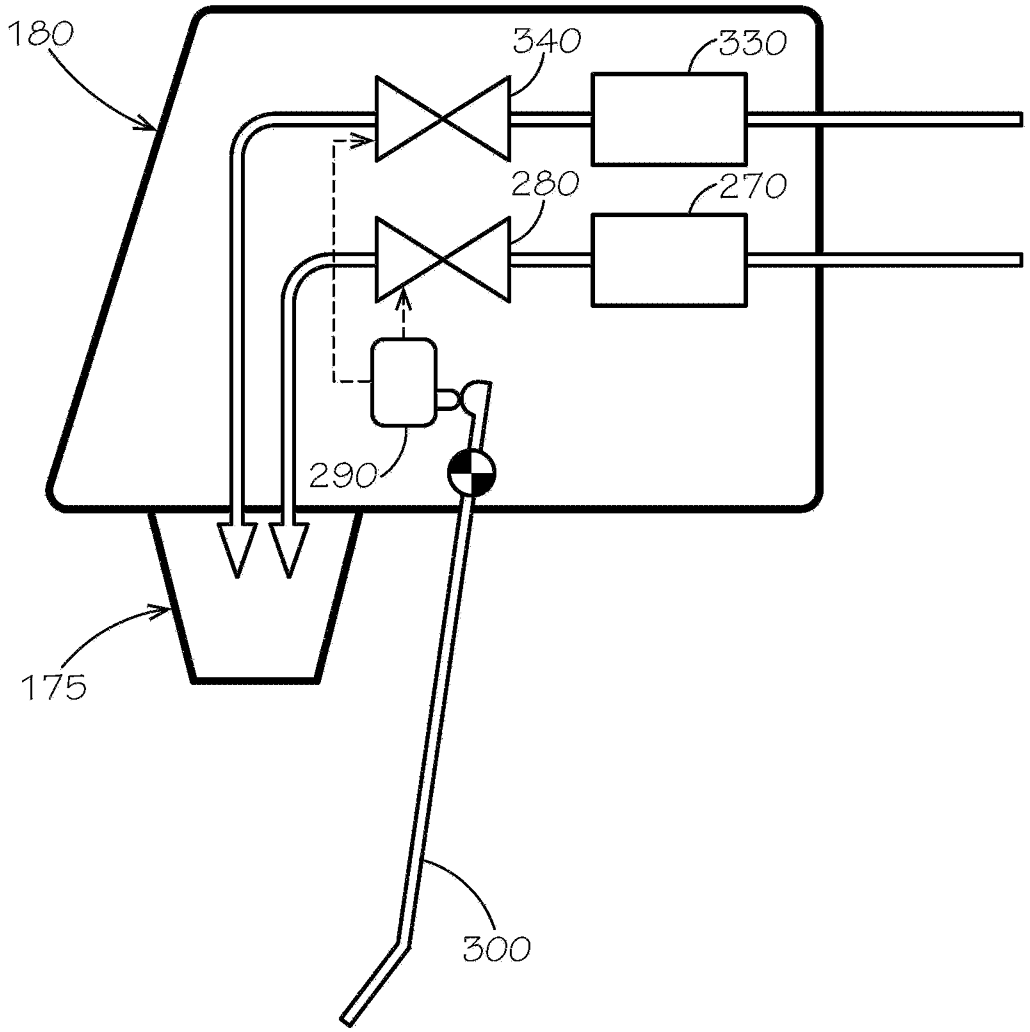
FIG. 2 is a schematic diagram of a dispensing valve of the beverage dispenser of FIG. 1.

Referring now to the drawings, in which like numerals refer to like elements throughout the several views, FIG. 1 shows a schematic diagram of a beverage dispenser 100 as may be described herein. Generally described, the beverage dispenser 100 may mix a number of fluids such as one or more syrups 110 and one or more diluents 120 to form any number of different beverages 130. Other types of fluids such as flavor additives and other types of ingredients also may be used herein. Any number of fluids may be mixed herein in any volume or order. The dispensed beverages 130 may be chilled, heated, or at any temperature.

The syrups 110 or other ingredients may be stored in a number of ingredient containers 140. The ingredient containers 140 may be conventional five gallon bag-in-box containers or other type of container. The ingredient containers 140 may be positioned within, adjacent to, or remote from the beverage dispenser 100. Different types of containers also may be used herein.

The beverage dispenser 100 may have one or more syrup circuits 150 in communication with each ingredient contain 140. Likewise, the beverage dispenser 100 may have one or more diluent circuits 160 in communication one or more diluent sources 170. Any number of syrup circuits 150 and diluent circuits 160 may be used herein. Flavoring or additive circuits and the like also may be used.

Each syrup circuit 150 may extend from one of the ingredient containers 140 to a nozzle 175 of a dispensing valve 180 via a syrup line 190. Likewise, each diluent circuit 160 may extend from one of the diluent sources 170 to the nozzle 175 of the dispensing valve 180 via a diluent line 200. The syrup lines 190 and the diluent lines 200 may be made from, for example, food grade thermoplastics and the like. Other types of materials may be used herein as will be described in more detail below. Any number of the dispensing valves 180 may be used herein. Each dispensing valve 180 may be positioned on, for example, a back board 210 of a dispensing tower 220. Other positions and other types of equipment may be used herein.

Each syrup circuit 150 may have a syrup pump 230 thereon. By way of example, the syrup pump 230 may be a conventional carbon dioxide, powered on demand pump 240 and the like. The carbon dioxide, powered on demand pump 240 may be powered by a flow of pressurized carbon dioxide from a carbon dioxide source 250 via a carbon dioxide line 260. The carbon dioxide source 250 may be any type of conventional pressurized container and the like. Other types of syrup pumps 230 and fluid movement devices may be used herein.

The syrup pump 230 may pump the syrup through the syrup line 190 to the dispensing valve 180. The dispensing valve 180 may have a syrup flow controller 270 and a syrup solenoid valve 280 therein. The syrup flow controller 270 may be a mechanical device with a fixed flow rate therethrough. The flow rate may be adjusted manually as desired. The syrup solenoid valve 280 may be an on/off type device. The syrup solenoid valve 280 may include an on/off switch 290. The on/off switch 290 may be operated by an activation lever 300 attached to the dispensing valve 180. A consumer thus can operate the syrup circuit 150 of the dispensing valve 180 by pushing his or her cup against the actuation lever 300 to begin a flow therethrough.

Likewise, each diluent circuit 150 may have a diluent pump 310 thereon. By way of example, the diluent pump 310 may be a positive displacement pump 320 and the like. The positive displacement pump 320 may be a vibration pump, a solenoid pump, a gear pump, an annular pump, a peristaltic pump, a syringe pump, a piezo pump, or any other type of positive displacement device that is designed to pump a fixed displacement of fluid for each pump cycle. Other types of diluent pumps 310 and fluid movement devices may be used herein.

The diluent pump 310 may pump the diluent through the diluent line 200 to the dispensing valve 180. The dispensing valve 180 may have a diluent flow controller 330 and a diluent solenoid valve 340 therein. The diluent flow controller 330 and the diluent solenoid valve 340 may be similar to the syrup flow devices described above. Given such, the consumer thus can operate the diluent circuit 160 of the dispensing valve 180 by pushing his or her cup against the actuation lever 300 to begin a flow therethrough.

The beverage dispenser 100 also may include an ice chamber 350. The ice chamber 350 may be of conventional design and may have any suitable size, shape, or configuration. The ice chamber 350 may be filled with a volume of ice and water and/or the ice chamber 350 may have a number of cooling coils (not shown) therein so as to promote the growth of an ice bank therein. The syrup lines 190 and the diluent lines 200 may extend therethrough so as to chill the fluids flowing therethrough. Other components and other configurations may be used herein.

The beverage dispenser 100 may have a carbonator 360 positioned in or near the ice chamber 350. The carbonator 360 may be of conventional design. The carbonator 360 may take a flow of diluent from the diluent line 200 and a flow of carbon dioxide from the carbon dioxide source 250 via a carbonator carbon dioxide line 370. The diluent and the carbon dioxide mix with in the carbonator 360 to create carbonated water. The carbonated water then may flow to the dispensing valve 190. The beverage dispenser 100 also may have a carbonated water recirculation circuit 380 with a recirculation pump 390 so as to recirculate the diluent so as to maintain the diluent at an appropriate chilled temperature. Although the diluent circuit 160 shown is a carbonated water circuit, one or more plain water circuits also may be used that bypass the carbonator 360. Depending on the distance between the dispensing valve 180 and the ice chamber 350, the syrup lines 190 and the diluent lines 200 may run through an extended insulated "python" 395 so as to maintain the fluids therein at the appropriate temperature. Other components and other configurations may be used herein.

Figure 3:
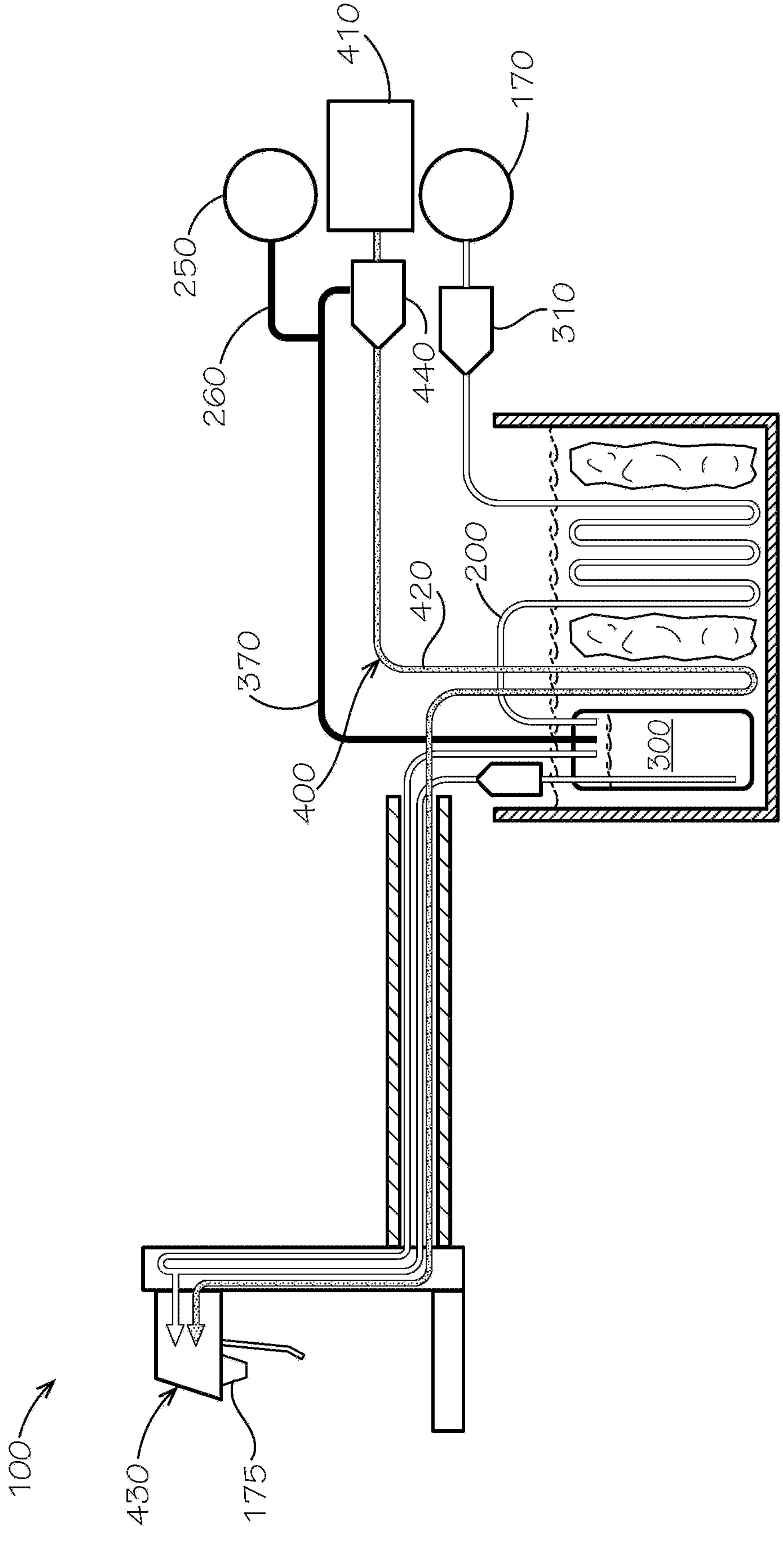
FIG. 3 is a schematic diagram of a limited timing offering circuit for use with the beverage dispenser of FIG. 1.

FIG. 3 shows an example of a limited time offering circuit 400 that may be used in place of one or more of the syrup circuits 150 of the beverage dispenser 100 as may be described herein. This limited time offering circuit 400 may extend from a limit time offering ingredient container 410 through a limit line offering line 420 to a limited time offering dispensing valve 430 via a limited time offering pump 440. Each of the limited time offering components used herein preferably is made out of an easy to clean material and/or made out of a substantially non-flavor absorbing material. For example, the limited time offering line 420 may be made out of stainless steel and the like. The internal components of the limited time offering dispensing valve 430 and the limited time offering pump 440 may be made out similar materials or other types of non-flavor absorbing materials. Other components and other configurations may be used herein.

Figure 4:
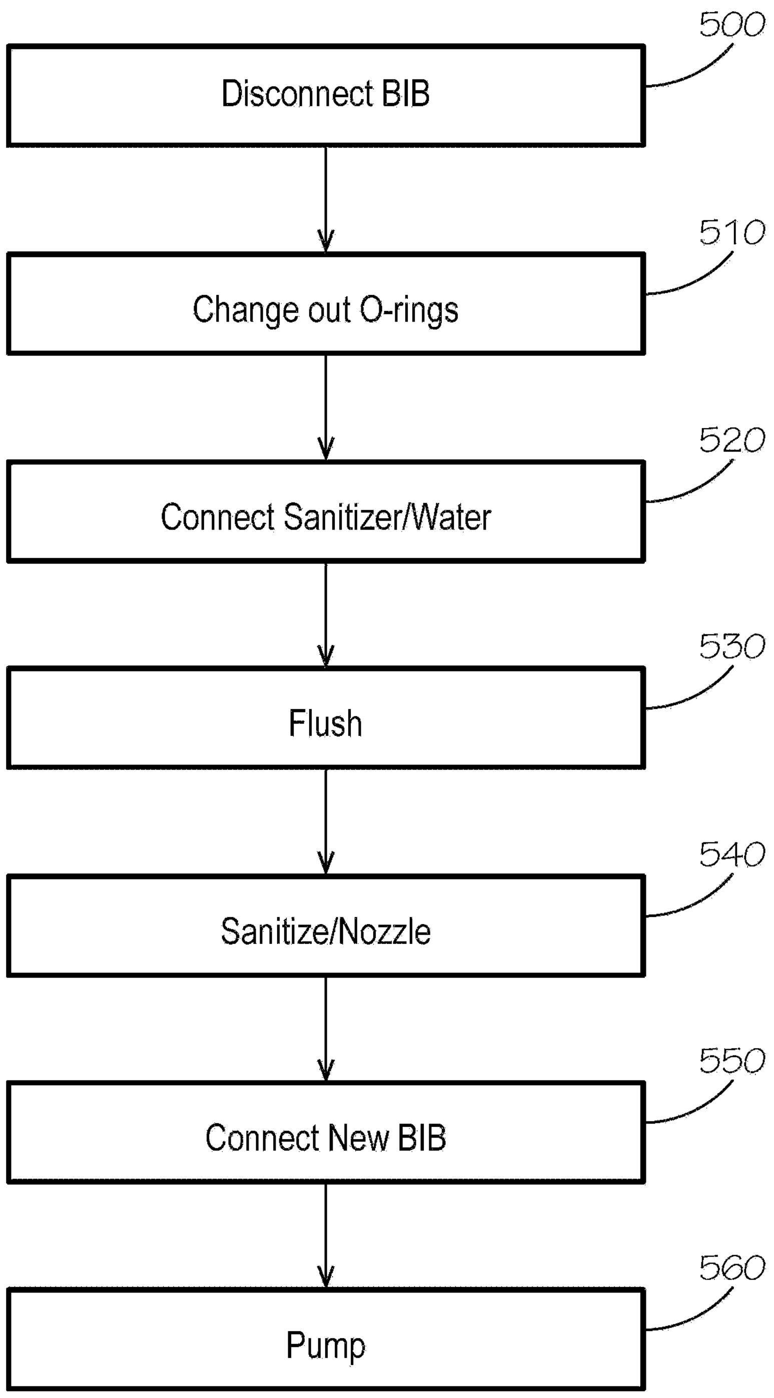
FIG. 4 is a flow chart of exemplary method steps of changing over a beverage brand or flavor in the limit time offering circuit of FIG. 3.

FIG. 4 shows exemplary method steps in changing over the beverage dispenser 100 over to a limited time offering beverage. The instructions may be displayed on the beverage dispenser 100 on a non-consumer user interface and the like. Specifically, an instruction wizard on the user interface may provide step by step instructions for product change out. At step 500, the operator may disconnect the limited time offering line 420 from the current ingredient container 140 or the current limited time offering ingredient container 410. At optional step 510, the operator may disconnect the limited time offering dispensing valve 430, swap out the internal O-rings, and replace the limited time offering dispensing valve 430. At step 520, the operator may connect the limited time offering line 420 to a special bag-in-box connector and may place the connector in a sanitizing solution and/or water. At step 530, the operator flushes the limited time offering line 420 for a predetermined duration. At step 540, the nozzle 175 of the limited time offering dispensing valve 430 may be disconnected and sanitized. At step 550, the special bag-in-box connector may be removed and the limited time offering line 420 may be connected to a new limited time offering ingredient container 410. At step 560, the limited time offering circuit 400 may be primed. A new limited time offering beverage then may be dispensed. Other and different method steps may be used herein in any order.

The use of one or more limited time offering circuits 400 thus provides the beverage dispenser 100 with increased flexibility to accommodate limited time offerings as well as any type of beverage with a possibly smaller volume. By using stainless steel and other types of non-flavor absorbing materials for the contact points with the limited time offering syrup, the limited time offering circuit 400 can be quickly and easily changed over to a new type of syrup without a service call, extensive downtime, or concern with flavor carry over.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof

We claim:

1. A beverage dispenser capable of dispensing one or more limited time offering beverages, comprising:

a dispensing valve;

a limited time offering ingredient source;

a limited time offering circuit extending between the dispensing valve and the limited time offering ingredient source;

wherein the limited time offering circuit comprises a stainless steel line extending between the dispensing valve and the limited time offering ingredient source;

a diluent circuit;

the diluent circuit extending between the dispensing valve and a diluent source;

wherein the diluent circuit comprises a thermoplastic line extending between the dispensing valve and the diluent source; and a syrup circuit;

the syrup circuit extending between the dispensing valve and an ingredient container; and wherein the syrup circuit comprises a thermoplastic line extending between the dispensing valve and the ingredient container.

2. The beverage dispenser of claim 1, wherein the dispensing valve comprises non-flavor absorbing materials.

3. The beverage dispenser of claim 1, wherein the dispensing valve comprises a flow controller, wherein the flow controller comprises non-flavor absorbing materials.

4. The beverage dispenser of claim 1, wherein the dispensing valve comprises a solenoid, wherein the solenoid comprises non-flavor absorbing materials.

5. The beverage dispenser of claim 1, wherein the limited time offering circuit comprises a limited time offering pump in communication with the stainless steel line.

6. The beverage dispenser of claim 5, wherein the limited time offering pump comprises non-flavor absorbing materials.

7. The beverage dispenser of claim 5, wherein the limited time offering pump comprises a carbon dioxide powered pump in communication with a carbon dioxide source.

8. The beverage dispenser of claim 1, further comprises an ice chamber and wherein the stainless steel line extends through the ice chamber.

9. The beverage dispenser of claim 1, further comprising a plurality of syrup circuits.

10. The beverage dispenser of claim 1, wherein the dispensing valve comprises a disconnectable nozzle.

11. A method of changing over a bag-in-box of a beverage dispenser, comprising:

disconnecting a stainless steel line from an existing bag-in-box;

placing the stainless steel line a sanitation solution;

flushing the stainless steel line for a predetermined duration;

disconnecting a dispensing nozzle;

sanitizing the dispensing nozzle;

connecting the stainless steel line to a new bag-in-box; and priming the stainless steel line.

12. The method of claim 11, further comprising the step of disconnecting a dispensing valve from the stainless steel line.

* * * * *